United States Patent
Kim et al.

(10) Patent No.: US 10,649,575 B2
(45) Date of Patent: *May 12, 2020

(54) TOUCH SENSOR INTEGRATED DISPLAY DEVICE

(71) Applicant: LG DISPLAY CO., LTD., Seoul (KR)

(72) Inventors: Cheolse Kim, Daegu (KR); Buyeol Lee, Goyang-si (KR); Sunjung Lee, Seoul (KR); Sangsoo Hwang, Seoul (KR); Yoonhwan Woo, Seoul (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,024

(22) Filed: Nov. 27, 2018

(65) Prior Publication Data

US 2019/0163315 A1    May 30, 2019

Related U.S. Application Data

(63) Continuation of application No. 15/157,305, filed on May 17, 2016, now Pat. No. 10,180,750, which is a
(Continued)

(30) Foreign Application Priority Data

Feb. 25, 2011 (KR) .................. 10-2011-0017181
Aug. 4, 2011 (KR) .................. 10-2011-0077644

(51) Int. Cl.
*G06F 3/041* (2006.01)
*G06F 3/044* (2006.01)
(Continued)

(52) U.S. Cl.
CPC ........ *G06F 3/0416* (2013.01); *G02F 1/13338* (2013.01); *G02F 1/136286* (2013.01);
(Continued)

(58) Field of Classification Search
CPC ...... G06F 3/0416; G06F 3/0412; G06F 3/044; G06F 2203/04103; G09G 3/3648;
(Continued)

(56) References Cited

U.S. PATENT DOCUMENTS 4,345,248 A    8/1982    Togashi et al.
5,392,058 A    2/1995    Tagawa
(Continued)

FOREIGN PATENT DOCUMENTS

WO    2010088670 A1    8/2010
WO    2010137727 A1    12/2010

*Primary Examiner* — Jonathan A Boyd
(74) *Attorney, Agent, or Firm* — Morgan, Lewis & Bockius LLP

(57) ABSTRACT

A touch sensor integrated display device is provided comprising gate lines and data lines formed on a substrate to be intersected with each other, a plurality of pixel electrodes formed at intersections between the gate lines and the data lines, and a common electrode formed to overlap the plurality of pixel electrodes through an insulating film disposed between the common electrode and the plurality of pixel electrodes, wherein the common electrode includes at least two touch electrodes, each of which is connected to at least one of signal lines arranged in one of a first direction and a second direction crossing the first direction.

28 Claims, 17 Drawing Sheets

Related U.S. Application Data continuation of application No. 14/981,550, filed on Dec. 28, 2015, now Pat. No. 9,639,205, which is a continuation of application No. 13/337,390, filed on Dec. 27, 2011, now Pat. No. 9,250,735.

(51) Int. Cl.
*G02F 1/1333* (2006.01)
*G09G 3/36* (2006.01)
*G02F 1/1362* (2006.01)
*G02F 1/1343* (2006.01)

(52) U.S. Cl.
CPC ............ *G06F 3/044* (2013.01); *G06F 3/0412* (2013.01); *G09G 3/3648* (2013.01); *G02F 2001/134372* (2013.01); *G06F 2203/04103* (2013.01); *G09G 2354/00* (2013.01)

(58) Field of Classification Search
CPC .......... G09G 2354/00; G02F 1/136286; G02F 1/13338; G02F 2001/134372
See application file for complete search history.

(56) References Cited

U.S. PATENT DOCUMENTS

| | | | |
|---|---|---|---|
| 5,650,597 | A | 7/1997 | Redmayne |
| 7,663,607 | B2 | 2/2010 | Hotelling et al. |
| 7,812,827 | B2 | 10/2010 | Hotelling et al. |
| 9,250,735 | B2 | 2/2016 | Kim et al. |
| 9,639,205 | B2 | 5/2017 | Kim et al. |
| 10,180,750 | B2 * | 1/2019 | Kim .................. G06F 3/0412 |
| 2004/0125296 | A1 | 7/2004 | Sasabayashi |
| 2006/0097991 | A1 | 5/2006 | Hotelling et al. |
| 2006/0132462 | A1 | 6/2006 | Geaghan |
| 2008/0062139 | A1 | 3/2008 | Hotelling et al. |
| 2009/0033341 | A1 | 2/2009 | Son et al. |
| 2009/0040191 | A1 | 2/2009 | Tong et al. |
| 2010/0001973 | A1 | 1/2010 | Hotelling et al. |
| 2010/0059294 | A1 | 3/2010 | Elias et al. |
| 2010/0144391 | A1 | 6/2010 | Chang et al. |
| 2010/0188361 | A1 | 7/2010 | Kim et al. |
| 2010/0194707 | A1 | 8/2010 | Hotelling et al. |
| 2010/0265210 | A1 | 10/2010 | Nakanishi et al. |
| 2010/0302202 | A1 | 12/2010 | Takeuchi et al. |
| 2011/0096019 | A1 | 4/2011 | Tsai et al. |
| 2011/0102359 | A1 | 5/2011 | Chiba et al. |
| 2011/0141040 | A1 | 6/2011 | Kang et al. |
| 2011/0234513 | A1 | 9/2011 | Pan et al. |
| 2012/0162584 | A1 | 6/2012 | Chang et al. |
| 2016/0283032 | A1 | 9/2016 | Kim et al. |
| 2016/0306454 | A1 | 10/2016 | Wang et al. |

\* cited by examiner

TOUCH SENSOR INTEGRATED DISPLAY DEVICE

This application is a Continuation of U.S. patent application Ser. No. 15/157,305 filed on May 17, 2016, which is a Continuation of U.S. patent application Ser. No. 14/981,550 filed on Dec. 28, 2015, now U.S. Pat. No. 9,639,205, which is a Continuation of U.S. patent application Ser. No. 13/337,390 filed on Dec. 27, 2011, now U.S. Pat. No. 9,250,735, which claims the benefit of Korean Patent Application Nos. 10-2011-0017181 filed on Feb. 25, 2011 and 10-2011-0077644 filed on Aug. 4, 2011. All of the above-identified U.S. and Korean Patent Applications are incorporated herein by reference.

BACKGROUND

1. Field

This document relates to a display device, and more specifically to a touch sensor integrated display device.

2. Related Art

A touch sensor is a kind of input unit which is mounted on a video display device, such as a liquid crystal display (LCD), a field emission display (FED), a plasma display panel (PDP), an electroluminescence device (ELD), electrophoresis display (EPD), and so forth. While an image is displayed by the video display device, a user may contact, by pressing or touching, a touch panel on the video display device to input predetermined optional information through the touch sensor mounted in the video display device.

Touch sensors used for display devices as described above may be largely divided into an add-on type, an on-cell type, and an integrated type, according to structures thereof. In the case of an add-on type touch sensor, after a display device and the touch sensor have been manufactured in separate processes, respectively, the manufactured touch sensor is attached on the top plate of the display device. In the case of an on-cell type touch sensor, component parts constituting the touch sensor are directly formed on a surface of a top glass substrate on a display device. In the case of an integrated type touch sensor, the touch sensor is built in a display device to attain a thinner display device and improve durability.

The add-on type touch sensors, however, have some disadvantages in that display devices having the touch sensors become thick because the touch sensors are disposed on the display devices in the form of completely-finished products and in that the brightness of the display devices tend to be lowered, which deteriorates Visibility of the display devices. Further, display devices having the on-cell type touch sensors are relatively thinner than display devices having the add-on type touch sensors because separate touch sensors are formed on top surface of the display device. The display devices having the on-cell type touch sensors, however, have some disadvantages in that the entire thickness of the display devices becomes thicker and in that not only the number of processes but also manufacturing costs of the display devices are relatively higher because of driving electrode layers and sensing electrode layers constituting the touch sensors, and insulating films for insulating those electrode layers.

On the other hand, the integrated type touch sensors have some advantages in that they can realize substantially thinner display devices and improve durability, and thus, overcome the disadvantages of the display devices having the add-on type and the on-cell type touch sensors. Integrated type touch sensors include optical types, electrostatic capacity types, and so forth.

In the case of the optical type touch sensors, an optical sensing layer is formed on thin transistor substrate arrays of a display device. An object touching the optical sensing layer can be recognized through light reflected on the object by using light from a back light unit or infrared ray light. The optical type touch sensors can be normally and safely operated under dark surroundings, and surrounding light can act as a noise when the surrounding light is brighter than the reflected light from the object. For example, light reflected from the object has very low brightness so that even under slightly bright surroundings, touch recognition errors can occur. Especially, under very bright sun light, touch recognition by the optical type touch sensor may not operate normally.

The electrostatic capacity type touch sensors include a self capacitance type and a mutual capacitance type. In the case of the mutual capacitance type, a common electrode for display is divided into a driving electrode area and a sensing electrode area, and a mutual capacitance is formed between the driving electrode area and the sending electrode area so that a variation in mutual capacitance generated on touching can be measured to recognize the touching operation based on the measured values.

The mutual capacitance type touch sensors, however, have some disadvantages in that it is difficult to exactly recognize touched spots because the mutual capacitance generated on touching recognition is very small while parasitic capacitance between gate lines and data lines is relatively very large. The gate lines and the data lines are constitutional elements of the display device.

Furthermore, the mutual capacitance type touch sensors require very complex circuit wiring structures because many touch driving lines for touch driving and many touch sensing lines for touch sensing should be formed on the common electrode to obtain multi-touch recognition.

Accordingly, there exists a demand for a new type of touch sensor integrated display device for solving the problems of the above-mentioned prior art touch sensors.

SUMMARY

The embodiments of the present invention provide a touch sensor integrated display device wherein touch sensing elements for recognizing a touch can be also used as constituent elements of the display device, thus resulting in a reduced thickness of the display device and improved durability, and a touch sensor integrated display device wherein signal lines for recognizing a touch and data lines overlap each other to thus improve an aperture ratio of the display device.

An embodiment of the present invention provides a touch sensor integrated display device in which touch sensing elements for recognizing a touch are also used as components of the display device, thus reducing thickness and enhancing durability of the display device. An embodiment of the present invention provides a touch sensor integrated display device in which signal lines for recognizing a touch overlap data lines, thus enhancing an aperture ratio.

According to an embodiment of the present invention, there is provided a touch sensor integrated display device including gate lines and data line formed to cross each other on a substrate, a plurality of pixel electrodes formed at intersections of the gate lines and the data lines, and a common electrode formed to overlap the plurality of pixel electrodes with an insulating film interposed between the common electrode and the pixel electrodes, wherein the common electrode includes two or more touch electrodes, and each of the touch electrodes is connected with at least one of signal lines arranged in any one of a first direction and a second direction perpendicular to the first direction.

According to an embodiment of the present invention, there is provided a touch sensor integrated display device including gate lines formed on a substrate, signal lines formed to be spaced apart from the gate lines and parallel to the gate lines, a gate insulating film formed on a surface of the substrate on which the gate lines and the signal lines are formed, data lines formed on the gate insulating film and crossing the gate lines, a thin film transistor (TFT) formed on the gate insulating film and having a source electrode connected with the data line, a pixel electrode formed on the gate insulating film and connected with a drain electrode of the TFT, an interlayer insulating film formed on the gate insulating film on which the data line, the TFT and the pixel electrode have been formed, and formed at an intersection of the gate line and the data line, and a common electrode formed on the interlayer insulating film and connected with the signal lines through contact holes formed in the interlayer insulating film, wherein the common electrode includes two or more touch electrodes, and each of the touch electrodes is connected with the signal lines.

According to an embodiment of the present invention, there is provided a touch sensor integrated display device including gate lines formed on a substrate, a gate insulating film formed on a front surface of the substrate on which the gate lines are formed, data lines formed on the gate insulating film and crossing the gate lines, signal lines formed to be spaced apart from the data lines and formed to be parallel to the data lines, a thin film transistor (TFT) formed on the gate insulating film and having a source electrode connected with the data line, a pixel electrode formed on the gate insulating film, connected with a drain electrode of the TFT, and formed at an intersection of the gate line and the data line, an interlayer insulating film formed on the gate insulating film on which the data line, the TFT and the pixel electrode have been formed, and a common electrode formed on the interlayer insulating film and connected with the signal lines through contact holes formed in the interlayer insulating film, wherein the common electrode includes two or more touch electrodes, and each of the touch electrodes is connected with the signal lines.

According to an embodiment of the present invention, there is provided a touch sensor integrated display device including gate lines and data lines crossing each other to form pixel areas on a substrate, a plurality of pixel electrodes formed at the pixel areas, a common electrode formed to overlap the plurality of pixel electrodes with an insulating film interposed between the common electrode and the pixel electrodes, and including two or more touch electrodes, and one or more signal lines connected with the touch electrodes, respectively, and overlapping the data lines.

According to an embodiment of the present invention, there is provided a touch sensor integrated display device including gate lines formed on a substrate, a gate insulating film formed on a front surface of the substrate on which the gate lines are formed, data lines formed on the gate insulating film and crossing the gate lines, a thin film transistor (TFT) formed on the gate insulating film and having a source electrode connected with the data line, a pixel electrode formed on the gate insulating film, connected with a drain electrode of the TFT, and formed at an intersection of the gate line and the data line, an interlayer insulating film formed on the gate insulating film on which the data line, the TFT and the pixel electrode have been formed, signal lines formed on the interlayer insulating film and overlapping the data lines, a passivation film formed on the interlayer insulating film on which the signal lines are formed, and a common electrode formed on the passivation layer and connected with the signal lines through via holes formed in the passivation layer, wherein the common electrode includes two or more touch electrodes, and each of the touch electrodes is connected with the signal lines.

BRIEF DESCRIPTION OF THE DRAWINGS

The accompanying drawings, which are included to provide a further understanding of the embodiments of the invention and are incorporated in and constitute a part of this application, illustrate the embodiments of the invention and together with the description serve to explain the principle of the embodiments of the invention. In the drawings.

DETAILED DESCRIPTION OF THE EXEMPLARY EMBODIMENTS

Reference will now be made in detail to the embodiments of the present invention, examples of which are illustrated in the accompanying drawings.

Figure 1:
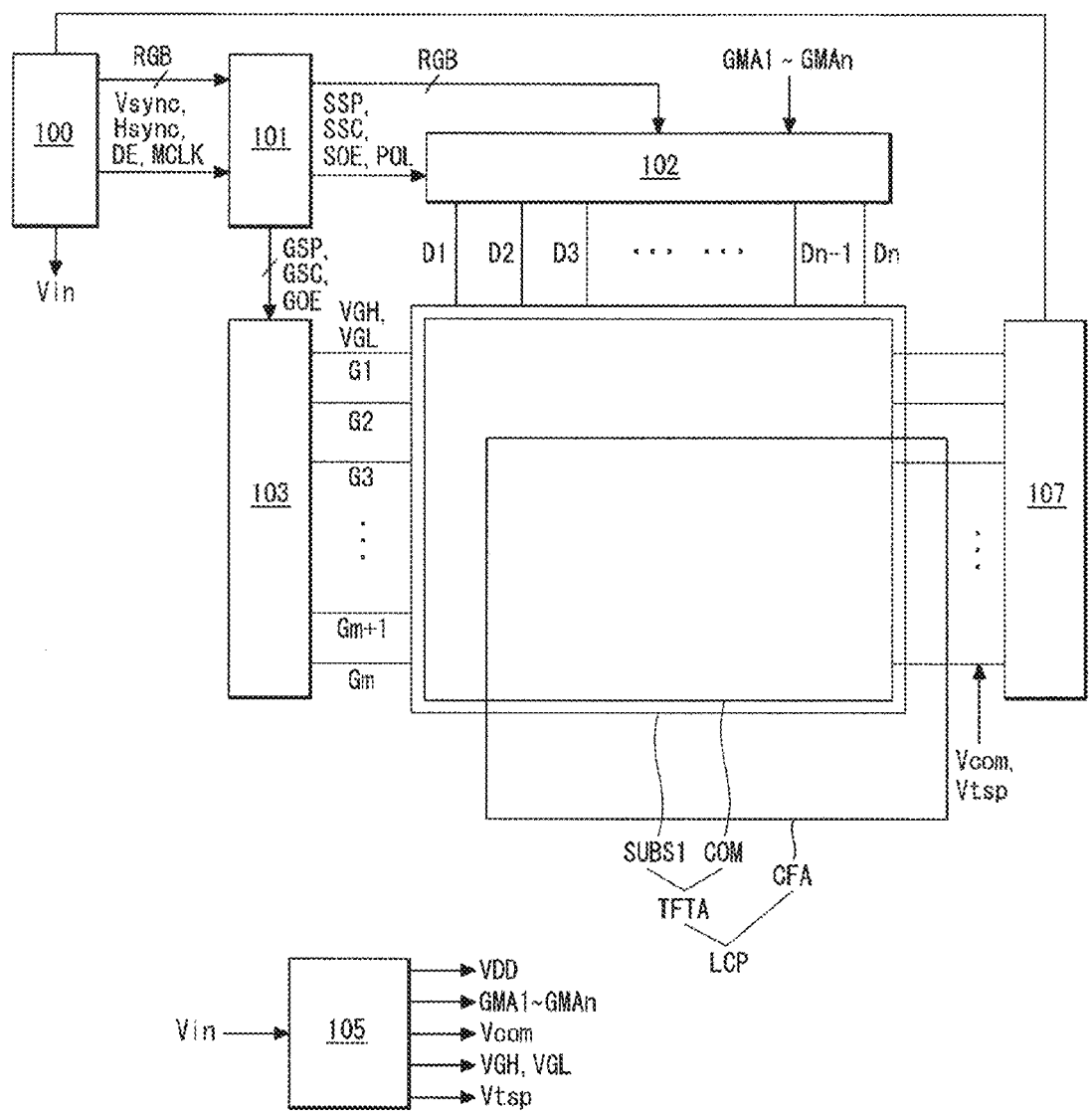
FIG. 1 is a view schematically illustrating a touch sensor integrated display device according to an embodiment of the present invention.
Figure 3:
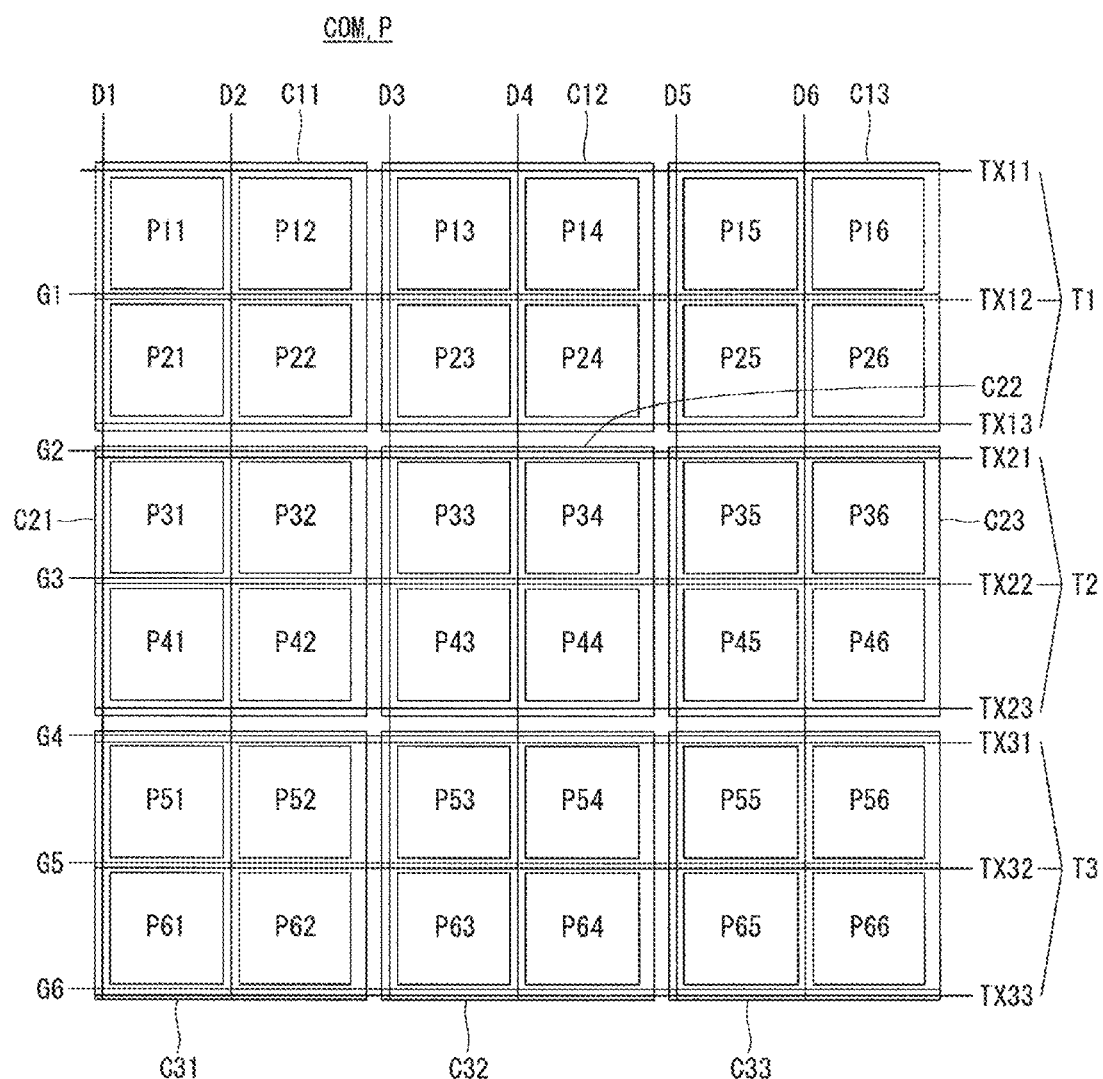
FIG. 3 is a view schematically illustrating a relationship among a common electrode (touch electrodes), pixel electrodes, and circuit wiring patterns in a touch sensor integrated display device according to an embodiment of the present invention.
Figure 4:
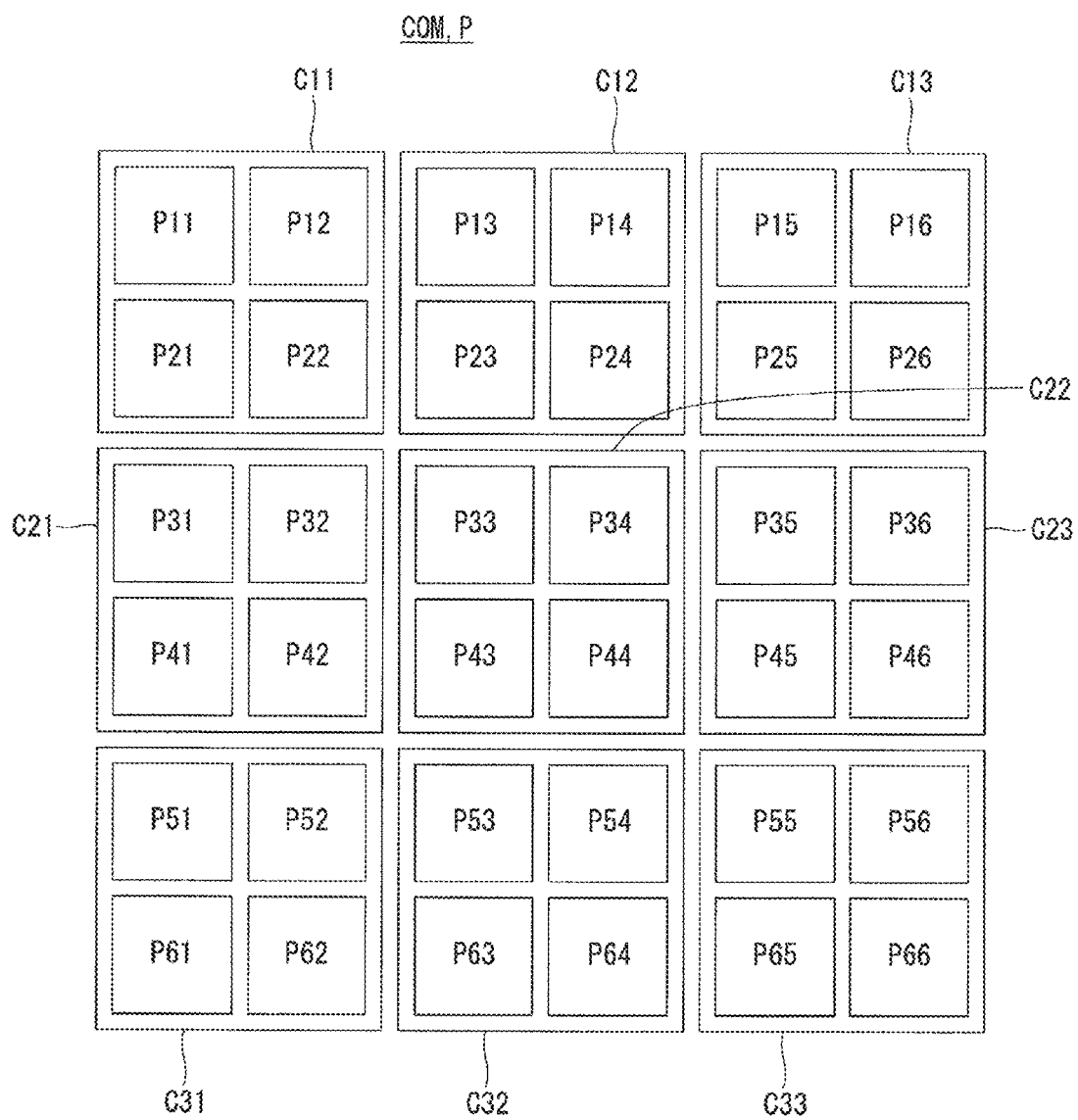
FIG. 4 is a view schematically illustrating an example of an arrangement relationship between a common electrode (touch electrodes) and pixel electrodes in a touch sensor integrated display device according to an embodiment of the present invention.

A touch sensor integrated display device on according to an embodiment of the present invention will be described in detail with reference to FIGS. 1 to 4. FIG. 1 is a view schematically illustrating a touch sensor integrated display device according to an embodiment of the present invention, FIG. 2 is a perspective view schematically illustrating a display panel of the display device illustrated in FIG. 1, FIG. 3 is a view schematically illustrating a relationship among a common electrode (touch electrodes), pixel electrodes, and circuit wiring patterns in a touch sensor integrated display device according to an embodiment of the present invention, and FIG. 4 is a view schematically illustrating an example of an arrangement relationship between a common electrode (touch electrodes) and pixel electrodes in a touch sensor integrated display device according to a first embodiment of the present invention.

Hereinafter, a touch sensor integrated liquid crystal display device according to an embodiment will be described in greater detail.

Figure 2:
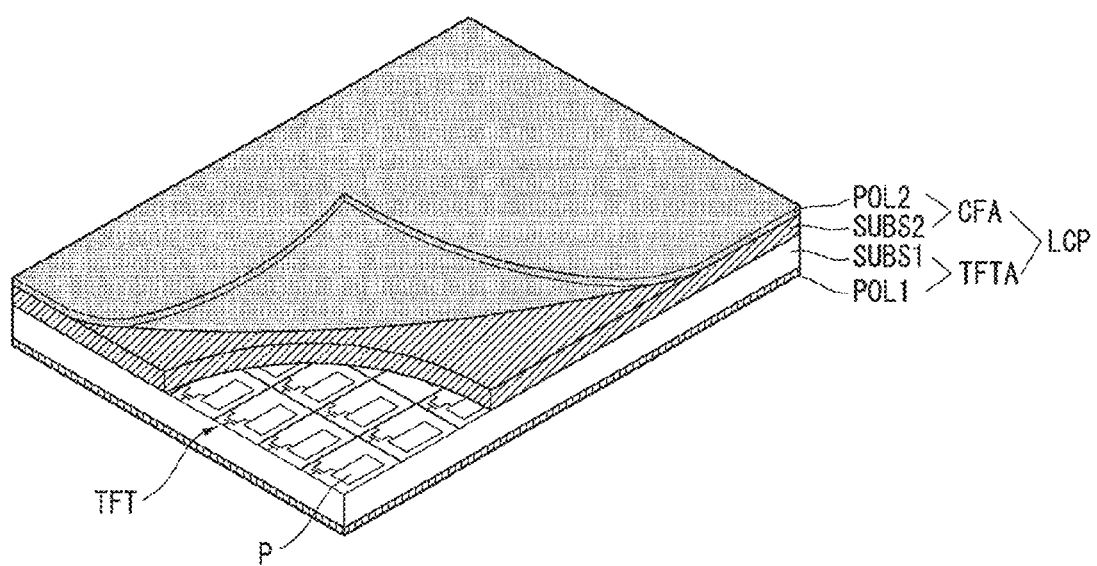
FIG. 2 is a perspective view schematically illustrating a display panel as shown on FIG. 1.

With reference to FIGS. 1 and 2, a touch sensor integrated liquid crystal display device according to an embodiment of the present invention includes a liquid crystal panel LCP, a host controller 100, a timing controller 101, a data driving unit 102, a gate driving unit 103, a power supply unit 105, and a touch recognition processor 107.

The liquid crystal panel LCP includes a color filter array CFA and a thin film transistor array TFTA and a liquid crystal layer disposed between the color filter array CFA and the thin film transistor array TFTA.

The thin film transistor array TFTA includes a plurality of gate lines G1, G2, G3, . . . Gm1 and Gm arranged in parallel to each other in a first direction (for example, an x direction) on a first substrate SUBS 1, data lines D1, D2, D3, . . . Dn−1 and Dn arranged in parallel to each other in a second direction (for example, a y direction) and intersecting the plurality of gate lines G1, G2, G3, . . . Gm1 and Gm, thin film transistors TFT formed at areas where the gate lines G1, G2, G3, . . . Gm1 and Gm and the data lines D1, D2, D3, . . . Dn−1 and Dn intersect each other, a plurality of pixel electrodes P for charging data voltages to liquid crystal cells, and a common electrode opposite to the plurality of pixel electrodes P.

The color filter array CFA includes black matrixes and color filters formed on a second substrate SUBS2. Polarizers POL1 and POL2 are respectively attached on the first substrate SUBS1 and the second substrate SUBS2 of the liquid crystal panel LCP, and an alignment film for setting a pretilt angle of liquid crystal molecules is formed on an inner surface of the panel LCP, which contacts the liquid crystal. Column spacers for maintaining cell gaps of liquid crystal cells may be formed between the first substrate SUBS1 and the second substrate SUBS2 of the liquid crystal panel LCP.

The common electrode COM is formed on the second substrate SUBS2 in a vertical electric field drive type, such as a twisted-nematic (TN) mode and vertical-alignment (VA) mode, and formed together with the pixel electrodes P on the first substrate SUBS1 in a horizontal electric field drive type, such as an in-plane-switching (IPS) mode and fringe-field-switching (FFS) mode. The horizontal electric field drive type will be described below.

The common electrode includes a plurality of touch electrodes wherein a size of one touch electrode corresponds to a size of a combination of more than several or several tens of pixel electrodes. The pixel electrodes P are arranged at intersections between the plurality of gate lines G1 to Gm and data lines D1 to Dn. For convenience of description, FIGS. 3 and 4 illustrate that the common electrode COM is divided into total nine touch electrodes C11, C12, C13, C21, C22, C23, C31, C32 and C33 which are arranged in a three (width of the common electrode) by three (length of common electrode) arrangement. As shown in FIGS. 3 and 4, each of the touch electrodes has a size corresponding to a size of a combination of four pixel electrodes arranged in a two (width of one touch electrode) by two (length of one touch electrode) arrangement. The four pixel electrodes shown in FIGS. 3 and 4 include totally pixel electrodes P11, P12, P21, P22; P13, P14, P23, P24; P15, P16, P25, P26; P31, P32, P41, P42; P33, P34, P43, P44; P35, P36, P45, P46, P51, P52, P61, P62; P53, P54, P63, P64; P55, P56, P65 and P66. As mentioned above, the embodiment described in connection with FIGS. 3 and 4 is only an example for convenience of description, and the number of the electrodes is not limited thereto.

The divided touch electrodes C11, C12, C13, C21, C22, C23, C31, C32 and C33 constituting the common electrode are connected to each other by a plurality of signal lines TX11, TX12, TX13, TX21, TX22, TX23, TX31, TX32 and TX33 in the form of one column unit or one row unit, so that the electrodes may function as constituent elements not only for realizing image display but also for a touch sensor.

Figure 5A:
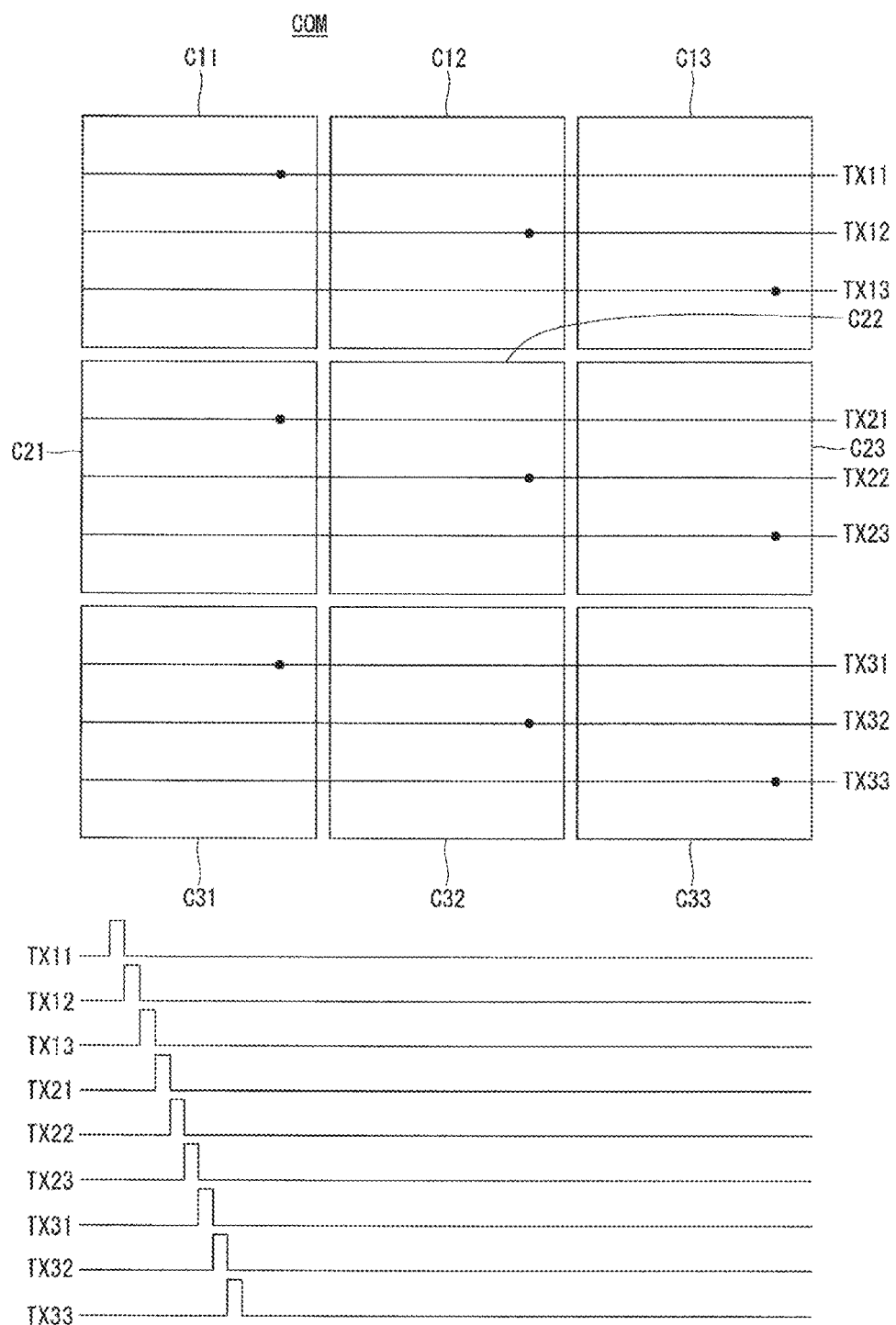
FIG. 5A is a view illustrating an example of a connection relationship between a common electrode (touch electrodes) and signal lines in a touch sensor integrated display device according to a first embodiment of the present invention.
Figure 5B:
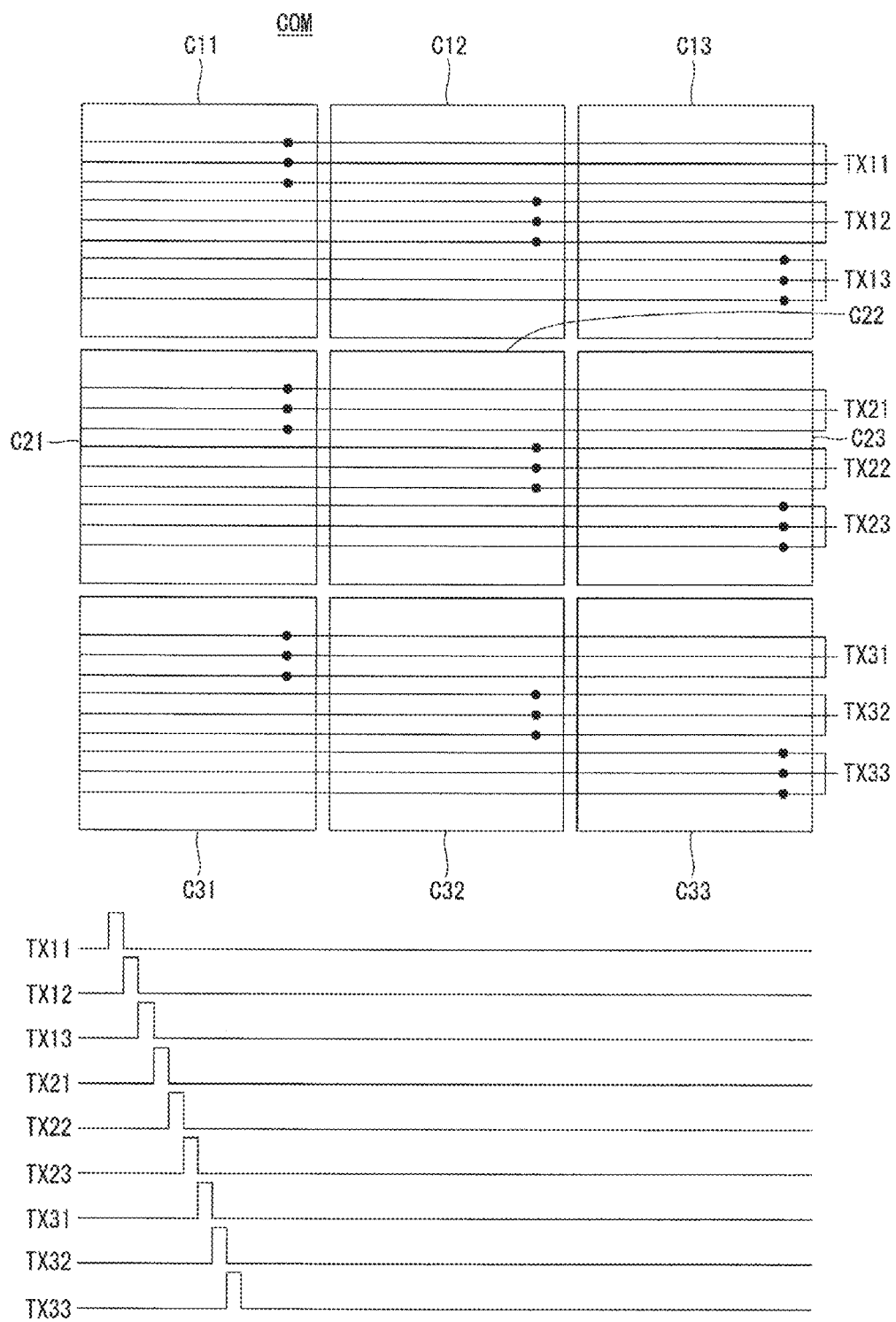
FIG. 5B is a view illustrating another example of a connection relationship between a common electrode (touch electrodes) and signal lines in the touch sensor integrated display device according to the first embodiment of the present invention.

FIG. 5A is a view illustrating an example of a connection relationship between a common electrode (touch electrodes) and signal lines in a touch sensor integrated display device according to the first embodiment of the present invention, and FIG. 5B is a view illustrating another example of a connection relationship between a common electrode (touch electrodes) and signal lines in the touch sensor integrated display device according to the first embodiment of the present invention.

With reference to FIG. 5A, a first row has three touch electrodes C11, C12 and C13, which are respectively connected to first to third signal lines TX11, TX12 and TX13 arranged along the first row. A second row has three touch electrodes C21, C22 and C23 which are respectively connected to fourth to sixth signal lines TX21, TX22 and TX23 arranged along the second row. A third row has three touch electrodes C31, C32 and C33 which are respectively connected to first to third signal lines TX31, TX32 and TX33 arranged along the third row. As mentioned above, since each of the touch electrodes arranged along row directions is connected with one signal line arranged along the corresponding row direction, although multi-touches occur on the display device, the touched spots can be exactly detected.

Similar to FIG. 5A, with reference to FIG. 5B, the first row has three touch electrodes C11, C12 and C13 which are respectively connected to first to third signal lines TX11, TX12 and TX13 arranged along the first row. However, there is a difference between FIG. 5A and FIG. 5B in that in FIG. 5b, each of the first to third signal lines TX11, TX12 and TX13 is branched into three parts and the three branched signal lines forming each signal line are all connected to one touch electrode. The connection relationship between the second row's touch electrodes C21, C22 and C23 and the fourth to sixth signal lines TX21, TX22 and TX23, and the connection relationship between the third row's touch electrodes C31, C32 and C33 and the third signal lines TX31, TX32 and TX33 are also the same as those between the first row's touch electrodes and the first to third signal lines. Therefore, further descriptions for those are omitted.

Figure 6A:
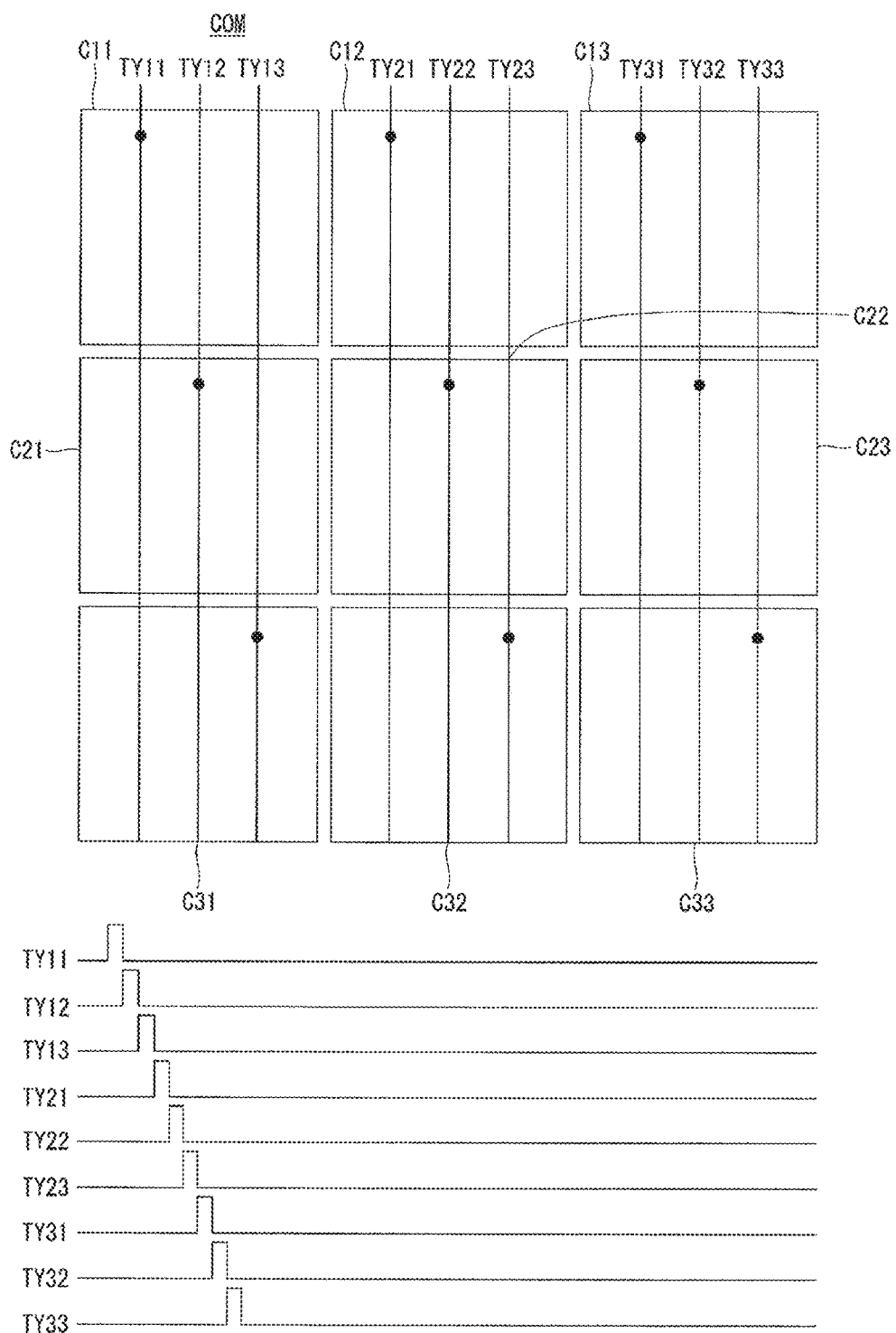
FIG. 6A is a view illustrating an example of a connection relationship between a common electrode (touch electrodes) and signal lines in a touch sensor integrated display device according to a second embodiment of the present invention.
Figure 6B:
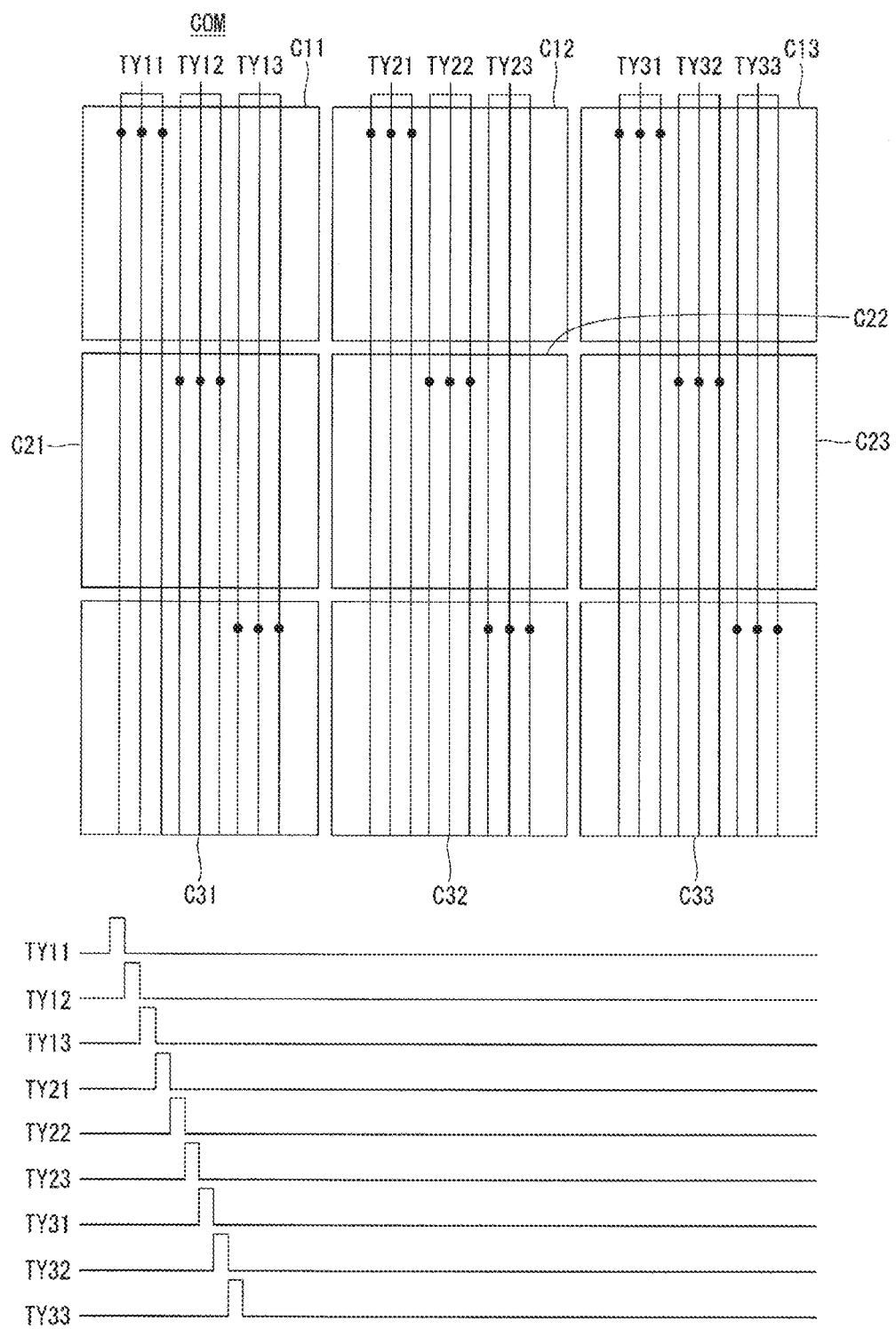
FIG. 6B is a view illustrating another example of a connection relationship between a common electrode (touch electrodes) and signal lines in the touch sensor integrated display device according to the second embodiment of the present invention.

FIG. 6A is a view illustrating an example of a connection relationship between a common electrode, which includes touch electrodes, and signal lines in a touch sensor integrated display device according to a second embodiment of the present invention, and FIG. 6B is a view illustrating another example of a connection relationship between a common electrode, which includes touch electrodes, and signal lines in the touch sensor integrated display device according to the second embodiment of the present invention.

FIGS. 6A and 6B are respectively different from FIGS. 5A and 5B in that the embodiments described in connection with FIGS. 6A and 6B have touch electrodes connected with the signal lines in the form of a column unit, whereas the touch electrodes described in connection with FIGS. 5A and 5B are connected with the signal lines in the form of a row unit.

With reference to FIG. 6A, the first column has three touch electrodes C11, C21 and C31 which are respectively connected to first to third signal lines TY11, TY12 and TY13 arranged along the first column. The second column has three touch electrodes C12, C22 and C32 which are respectively connected to fourth to sixth signal lines TY21, TY22 and TY23 arranged along the second column. The third column has three touch electrodes C13, C23 and C33 which are respectively connected to first to third signal lines TY31, TY32 and TY33 arranged along the third column. As mentioned above, since each of the touch electrodes arranged along column direction is connected with one signal line arranged along the corresponding column direction, although multi-touches occur on the display device, the touched spots can be exactly detected.

Similar to FIG. 6A, with reference to FIG. 6B, the first column has three touch electrodes C11, C21 and C31 which are respectively connected to first to third signal lines TY11, TY12 and TY13 arranged along the first column. However, there is a difference between FIG. 6A and FIG. 6B in that in FIG. 6B, each of the first to third signal lines TY11, TY12 and TY13 is branched into three parts and the three branched signal lines forming each signal line are all connected to one touch electrode. The connection relationship between the second column's touch electrodes C12, C22 and C32 and the fourth to sixth signal lines TY21, TY22 and TY23, and the connection relationship between the third column's touch electrodes C13 C23 and C33 and the third signal lines TY31, TY32 and TY33 are also the same as those between the first column's touch electrodes and the first to third signal lines. Therefore, further descriptions for those are omitted.

As described above, in the embodiments described in connection with FIGS. 5A, 5B, 6A and 6B, the touch electrodes having three rows and three columns are used. However, the embodiments are not limited thereto. For example, the number of the touch electrodes and the number of the signal lines connected with the touch electrodes can be properly changed according to conditions, such as usage of the display device. Further, each touch electrode can be connected with at least one of the signal lines. According to an embodiment, when several signal lines are connected to one touch electrode, ends of those signal lines are all coupled into one unit to output and input the same or substantially the same signal into and from each touch electrode.

Figure 7A:
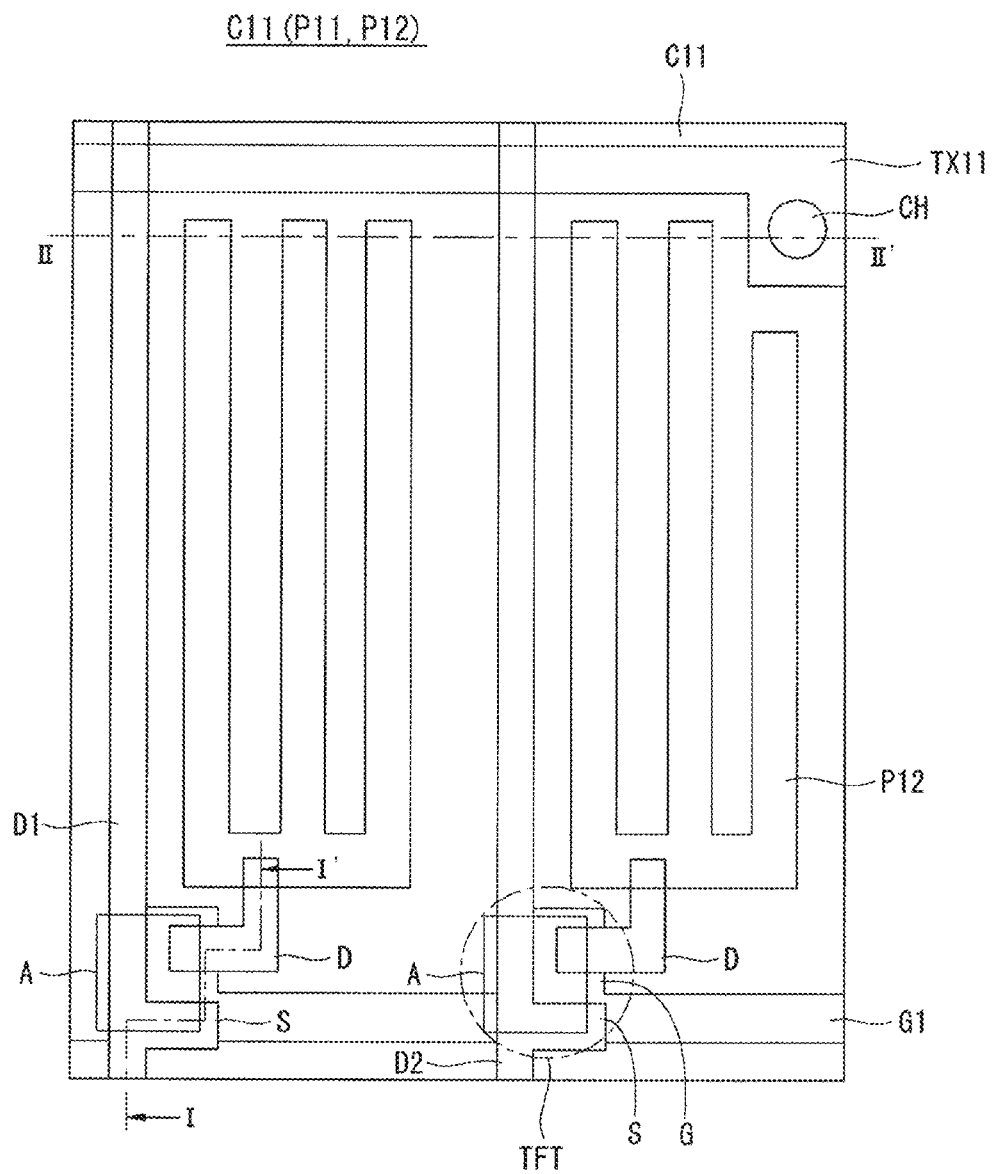
FIG. 7A is an enlarged plan view illustrating part of the touch sensor integrated display device according to the first embodiment of the present invention.
Figure 7B:
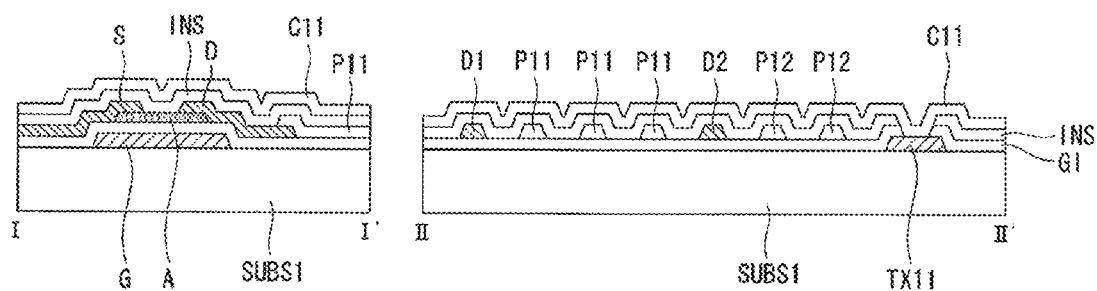
FIG. 7B is a cross sectional view taken along a line I-I' and a line II-II' illustrated in FIG. 7A.

FIG. 7A is an enlarged plan view illustrating part of the touch sensor integrated display device according to the first embodiment of the present invention, and FIG. 7B is a cross sectional view taken along a line I-I' and a line II-II' illustrated in FIG. 7A. As shown in FIGS. 7A and 7B, portions corresponding to the pixel electrodes P11 and P12 among the touch electrodes C11 of the common electrode COM of FIG. 3 are illustrated as examples, wherein the signal lines are connected to the touch electrodes in the direction of rows.

With reference to FIGS. 7A and 7B, the touch sensor integrated display device according to the first embodiment of the present invention includes a gate line G1 formed on the first substrate SUBS1, a gate electrode G extending from the gate line G1, and a first signal line TX11 spaced apart from and paralleled to the gate line G1.

The touch sensor integrated display device further includes a gate insulating film GI, which is formed on the gate line G1 having the gate electrode G and the first signal line TX11 on the substrate SUBS1, and a semiconductor pattern A which is formed on the gate insulating film GI to overlap part of the gate electrode G. The semiconductor pattern A includes an active area of a thin film transistor TFT which will be described later.

Further, the touch sensor integrated display device includes data lines D1 and D2 intersecting the gate line G1 via the gate insulating film GI, a source electrode S extending from the data lines D1 and D2, thin film transistors TFF each having a drain electrode D opposite to the source electrode S, and pixel electrodes P11 and P12 which are formed at intersections between the gate line G1 and the data lines D1 and D2 and respectively connected with the drain electrodes of the thin film transistors TFT.

The touch sensor integrated display device includes an interlayer insulating film INS formed on a top surface of gate insulating film GI on which the data lines D1 and D2, the transistors TFT and the pixel electrodes P11 and P12 are formed, and a common electrode (touch electrodes) C11 formed on the interlayer insulating film INS. The common electrode (touch electrodes) C11 is connected to the first signal line TX11 via a contact hole CH penetrating both the gate insulating film and the interlayer insulating film.

Figure 8A:
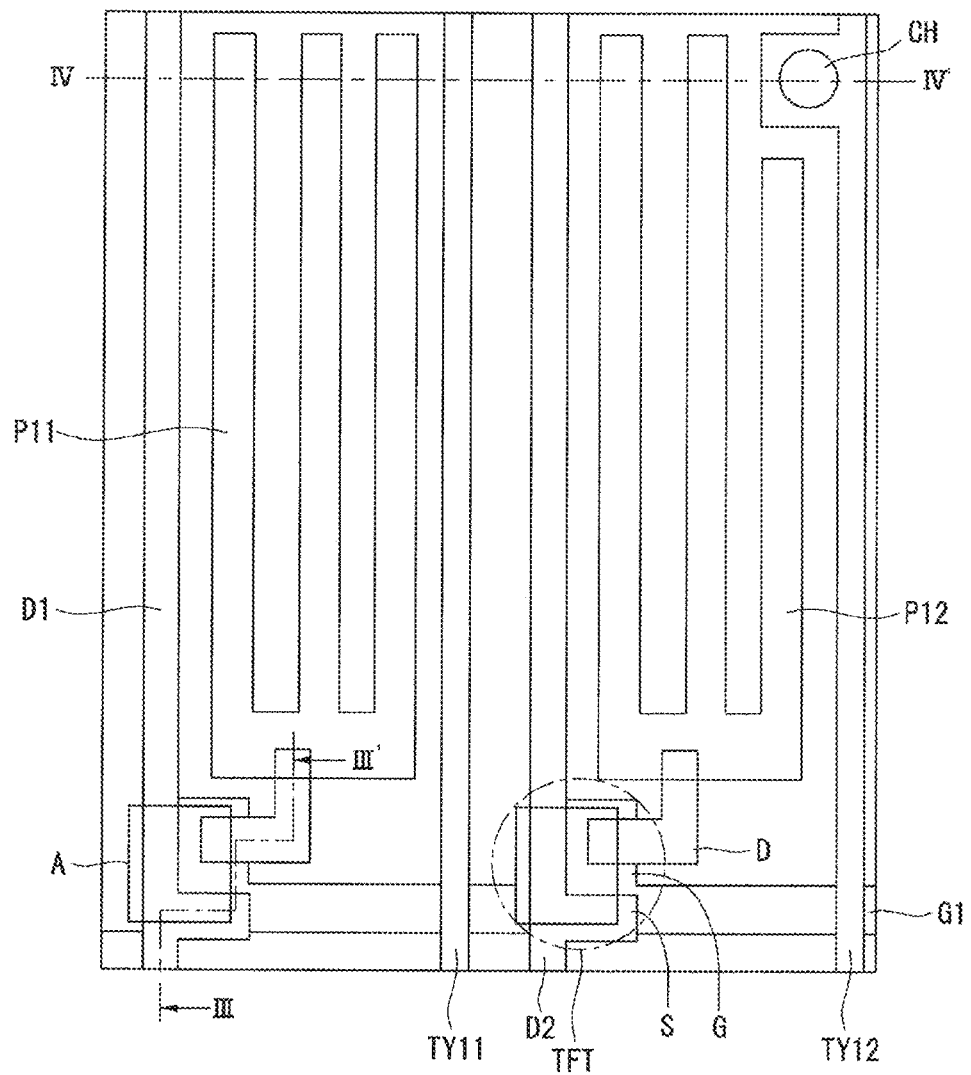
FIG. 8A is an enlarged plan view illustrating part of the touch sensor integrated display device according to the second embodiment of the present invention.
Figure 8B:
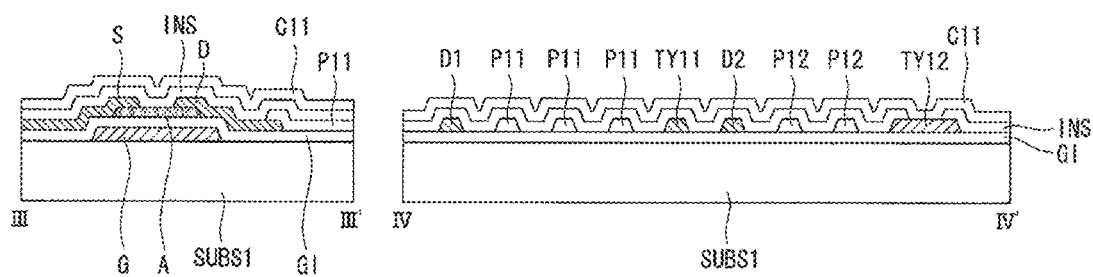
FIG. 8B is a cross sectional view taken along a line III-III' and a line IV-IV' illustrated in FIG. 8A.

FIG. 8A is an enlarged plan view illustrating part of the touch sensor integrated display device according to the second embodiment of the present invention, and FIG. 8B is a cross sectional view taken along a line III-III' and a line IV-IV' illustrated in FIG. 8A. As shown in FIGS. 8A and 8B, portions corresponding to the pixel electrodes P11 and P12 among the touch electrodes C11 of the common electrode COM of FIG. 3 are illustrated as examples, wherein the signal lines are connected to the touch electrodes in the direction of columns.

With reference to FIGS. 8A and 8B, the touch sensor integrated display device according to the second embodiment of the present invention includes a gate line G1 formed on the first substrate SUBS1 and a gate electrode G extending from the gate line G1.

The touch sensor integrated display device includes a gate insulating film GI formed on the substrate SUBS1 on which the gate line G1 having the gate electrode G is formed, and a semiconductor pattern A which is formed on the gate insulating film GI to overlap part of the gate electrode G. The semiconductor pattern A includes an active area of thin film transistors TFT which will be described later.

The touch sensor integrated display device further includes data lines D1 and D2 intersecting the gate line G1 via the gate insulating film G1, a source electrode S extending from data lines D1 and D2, thin film transistors TFF each having a drain electrode opposite to the source electrode S, a first signal line TY11 and a second signal line TY12 which are all spaced apart from and paralleled to the data lines D1 and D2, and pixel electrodes P11 and P12 which are formed at intersections between the gate line G1 and the data lines D1 and D1 and connected with the drain electrodes of the thin film transistors TFT.

The touch sensor integrated display device further includes an interlayer insulating film INS formed on a top surface of the gate insulating film GI on which the data lines D1 and D2, the transistors TFT and the pixel electrodes P11 and P12 are formed, and a common electrode (touch electrodes) C11 formed on the interlayer insulating film INS. The common electrode (touch electrodes) C11 is connected to the second signal line TY12 via a contact hole CH penetrating the interlayer insulating film.

Figure 9A:
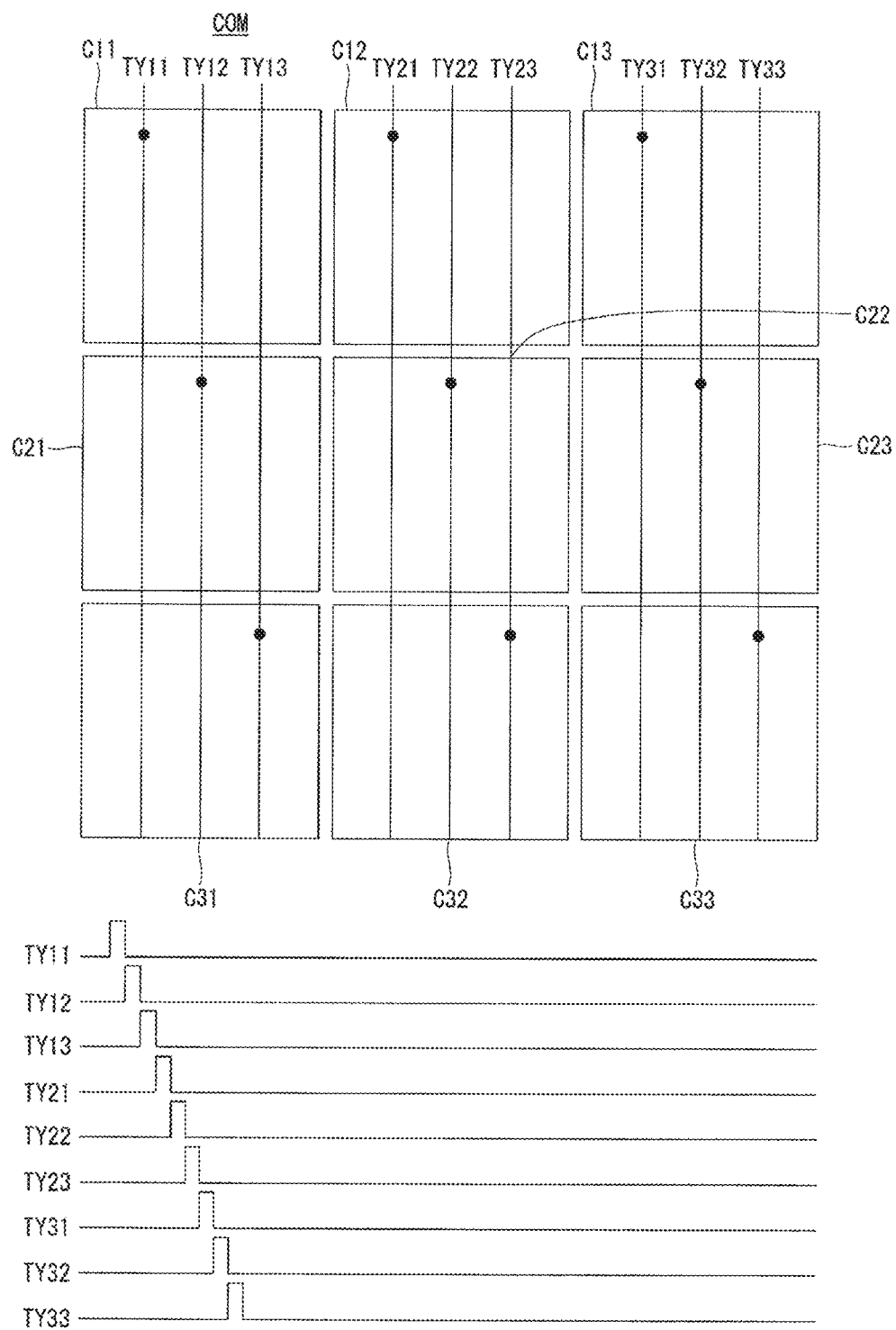
FIG. 9A is a view illustrating an example of a connection relationship between a common electrode (touch electrodes) and signal lines in a touch sensor integrated display device according to a third embodiment of the present invention.
Figure 9B:
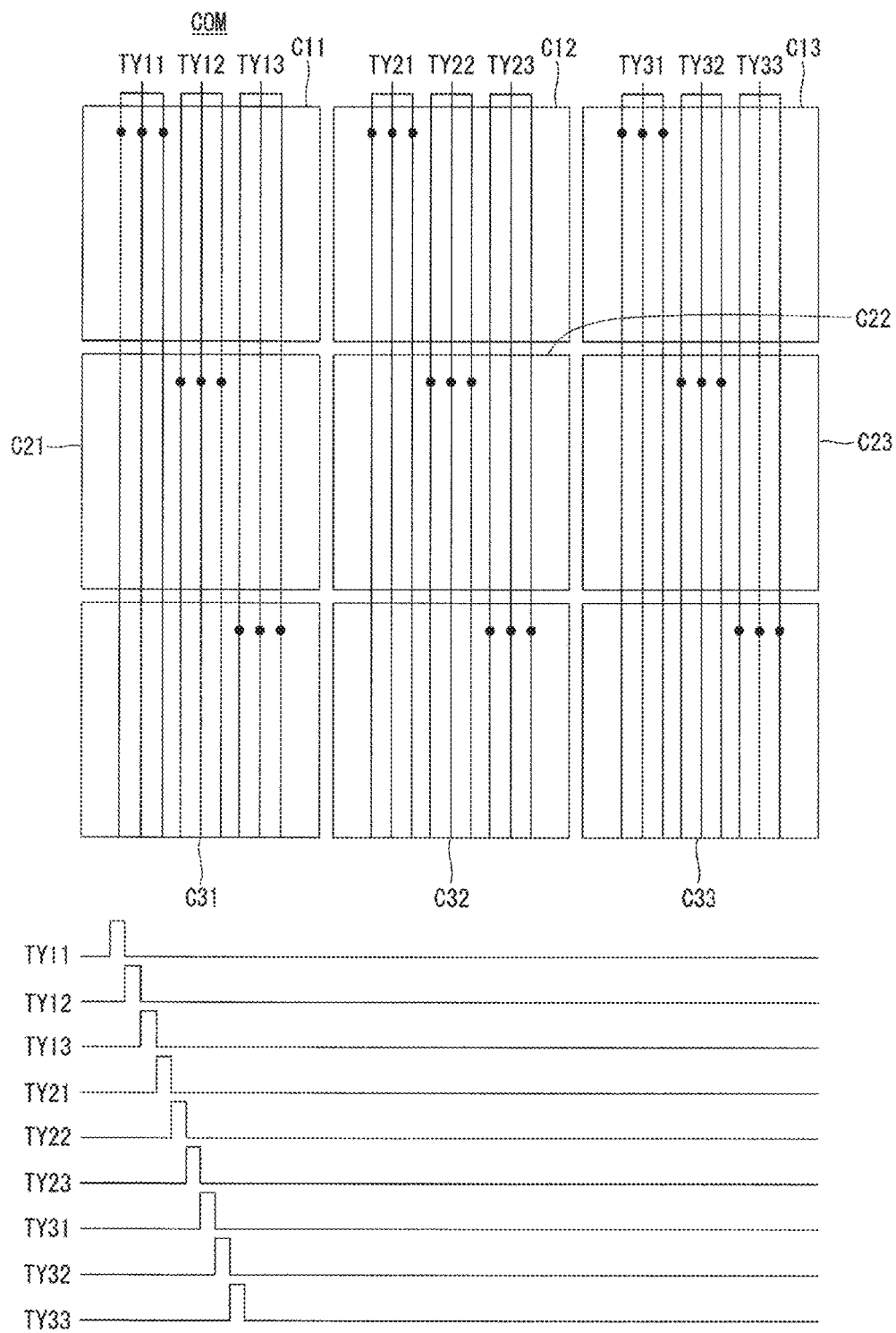
FIG. 9B is a view illustrating another example of a connection relationship between a common electrode (touch electrodes) and signal lines in the touch sensor integrated display device according to the third embodiment of the present invention.

FIG. 9A is a view illustrating an example of a connection relationship between a common electrode (touch electrodes) and signal lines in a touch sensor integrated display device according to a third embodiment of the present invention, and FIG. 9B is a view illustrating another example of a connection relationship between a common electrode (touch electrodes) and signal lines in the touch sensor integrated display device according to the third embodiment of the present invention.

With reference to FIG. 9A, the first column has three touch electrodes C11, C21 and C31 which are respectively connected to first to third signal lines TY11, TY12 and TY13 arranged along the first column. The second column has three touch electrodes C12, C22 and C32 which are respectively connected to fourth to sixth signal lines TY21, TY22 and TY23 arranged along the second column. The third column has three touch electrodes C13, C23 and C33 which are respectively connected to first to third signal lines TY31, TY32 and TY33 arranged along the third column. As mentioned above, since each of the touch electrodes arranged along the column direction is connected with one signal line arranged along the corresponding column direction, although multi-touches occur, the touched spots can be exactly detected.

With reference to FIG. 9B, the first column has three touch electrodes C11, C21 and C31 which are respectively connected to first to third signal lines TY11, TY12 and TY13 arranged along the first column. However, there is a difference between FIG. 9A and FIG. 9B in that in FIG. 6b, each of the first to third signal lines TY11, TY12 and TY13 is branched into three parts and the three branched signal lines forming each signal line are all connected to one touch electrode. The connection relationship between the second column's touch electrodes C12, C22 and C32 and the fourth to sixth signal lines TY21, TY22 and TY23, and the connection relationship between the third column's touch electrodes C13, C23 and C33 and the third signal lines TY31, TY32 and TY33 are also the same as those between the first column's touch electrodes and the first to third signal lines. Therefore, further descriptions for those are omitted.

As described above, in the embodiments described in connection with FIGS. 9A and 9B, the touch electrodes having three rows and three columns are used. However, the embodiments are not limited thereto. For example, the number of the touch electrodes and the number of the signal lines connected with the touch electrodes can be properly changed according to conditions, such as usage of the display device. Further, each touch electrode can be connected with at least one of signal lines. According to an embodiment, when several signal lines are connected to one touch electrode, the ends of those signal lines are all coupled into one unit to output and input the same or substantially the same signal to and from each touch electrode.

Figure 10A:
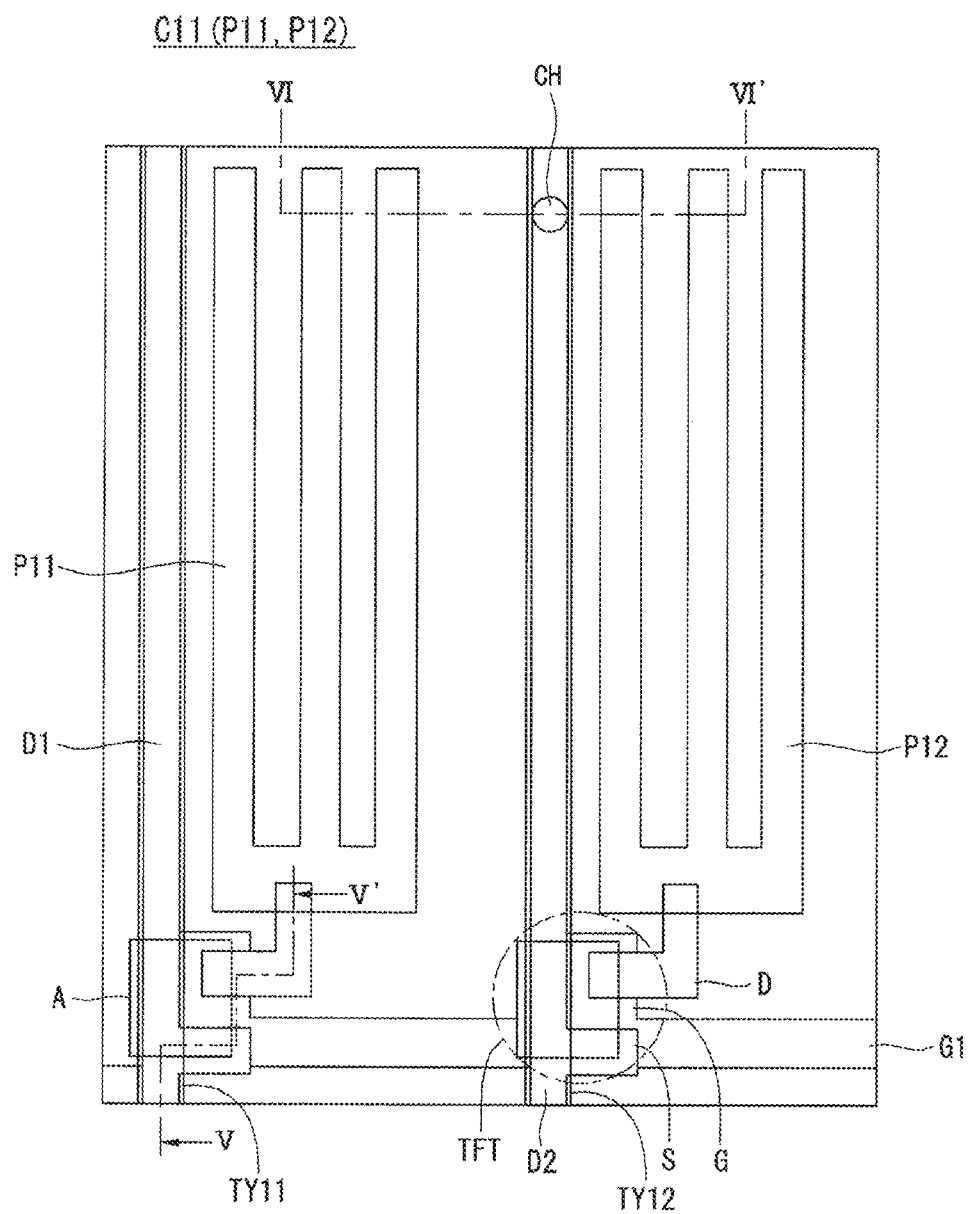
FIG. 10A is an enlarged plan view illustrating part of a touch sensor integrated display device according to an embodiment of the present invention.
Figure 10B:
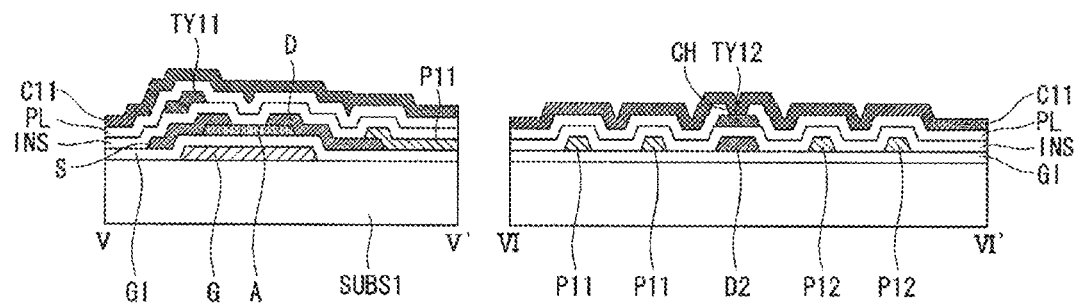
FIG. 10B is a cross sectional view taken along a line V-V' and a line VI-VI' illustrated in FIG. 10A.

FIG. 10A is an enlarged plan view illustrating part of the touch sensor integrated display device according to the third embodiment of the present invention and FIG. 10B is a cross sectional view taken along a line V-V' and a line VI-VI' illustrated in FIG. 10A. As shown in FIGS. 10A and 10B, portions corresponding to the pixel electrodes P11 and P12 among the touch electrodes C11 of the common electrode COM of FIG. 3 are illustrated as examples, wherein the signal lines are connected to the touch electrodes in the direction of column.

With reference to FIGS. 10A and 10B, the touch sensor integrated display device according to the third embodiment of the present invention includes a gate line G1 formed on the first substrate SUBS1, and a gate electrode G extending from the gate line G1.

The touch sensor integrated display device includes a gate insulating film GI formed on the substrate SUBS1 on which the gate line G1 having the gate electrode G is formed, and a semiconductor pattern A which is formed on the gate insulating film GI to overlap part of the gate electrode G. The semiconductor pattern A includes an active area of thin film transistors TFT which will be described later.

The touch sensor integrated display device further includes data lines D1 and D2 intersecting the gate line G1 via the gate insulating film G1, a source electrode S extending from the data lines D1 and D2, thin film transistors TFF each having a drain electrode opposite to the source electrode S, and pixel electrodes P11 and P12 which are formed at intersections between the gate line G1 and the data line D1 and D2, and connected with the drain electrodes of the thin film transistors TFT.

The touch sensor integrated display device further includes an interlayer insulating film INS formed on a top surface of gate insulating film GI on which the data lines D1 and D2, transistors TFT and pixel electrodes P11 and P12 are formed, and a first signal line TY11 and a second signal line TY12 overlapping the data lines D1 and D2 on the interlayer insulating film INS.

The first signal line TY11 and the second signal line TY12 are arranged in parallel to and overlap the data lines D1 and D2. The first signal line TY11 and the second signal line TY12 are made of lower-resistant metals or alloys thereof, such as aluminum (Al), aluminum-Neodymium (AlNd), copper (Cu), molybdenum (Mo), molybdenum-titanium (MoTi), chromium (Cr), and so forth.

Accordingly, the first signal line TY11 and the second signal line TY12 are arranged in parallel to and overlap the data lines D1 and D2. As such, since the first and second signal lines TY11 and TY12 are formed in a non-display area occupied by the data lines D1 and D2, a decrease in an aperture ratio of the display panel, which would occur if the lines TY11 and TY12 occupied the display area, can be prevented.

The touch sensor integrated display device includes a passivation film PL formed on a top surface of the interlayer insulating film INS on which the first signal line TY11 and the second signal line TY12 are formed, and a common electrode C11 formed on the passivation film PL. The common electrode (touch electrodes) C11 is connected to the second signal line TY12 via a contact hole CH penetrating the passivation film.

Figure 11:
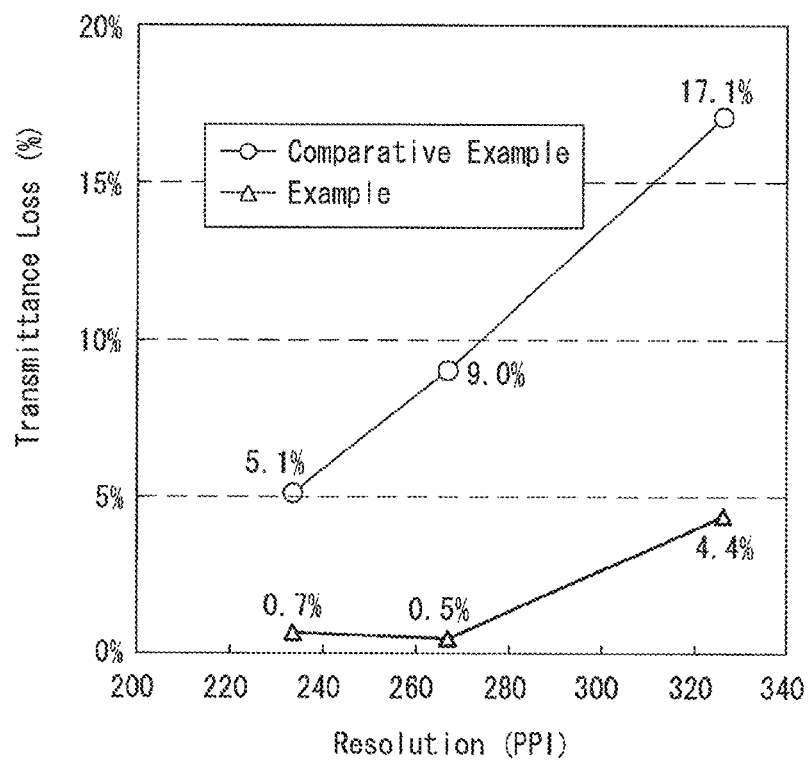
FIG. 11 is a graphical view illustrating transmittance losses measured for each resolution depending on whether data lines overlap signal lines.

FIG. 11 is a graphical view illustrating transmittance losses measured for each resolution depending on whether the data lines overlap the signal lines. A display device according to an embodiment (referred to as "Example" in the drawing) is formed by overlapping the data lines and the signal lines as shown in FIGS. 10A and 10B, and a comparative display device (referred to as "Comparative Example" in the drawing) does not have the data lines overlap the signal lines.

As illustrated in FIG. 11, for the same resolution of 230 PPI, Comparative Example indicates a transmittance loss of 5.1% and Example indicates a transmittance loss of 0.7%. For the same resolution of 266 PPI, Comparative Example indicates a transmittance loss of 9.0% and Example indicates a transmittance loss of 0.5%. For the same resolution of 330 PPI, Comparative Example indicates a transmittance loss of 17.1% and Example indicates a transmittance loss of 4.4%.

Accordingly, it can be seen from the results shown in FIG. 11 that the display device according to the embodiments of the present invention may reduce transmittance losses.

Hereinafter, the operation of a touch sensor integrated display device according to an embodiment of the present invention will be described. According to an embodiment, a 60 Hz time division driving process is used for the operation.

Figure 12:
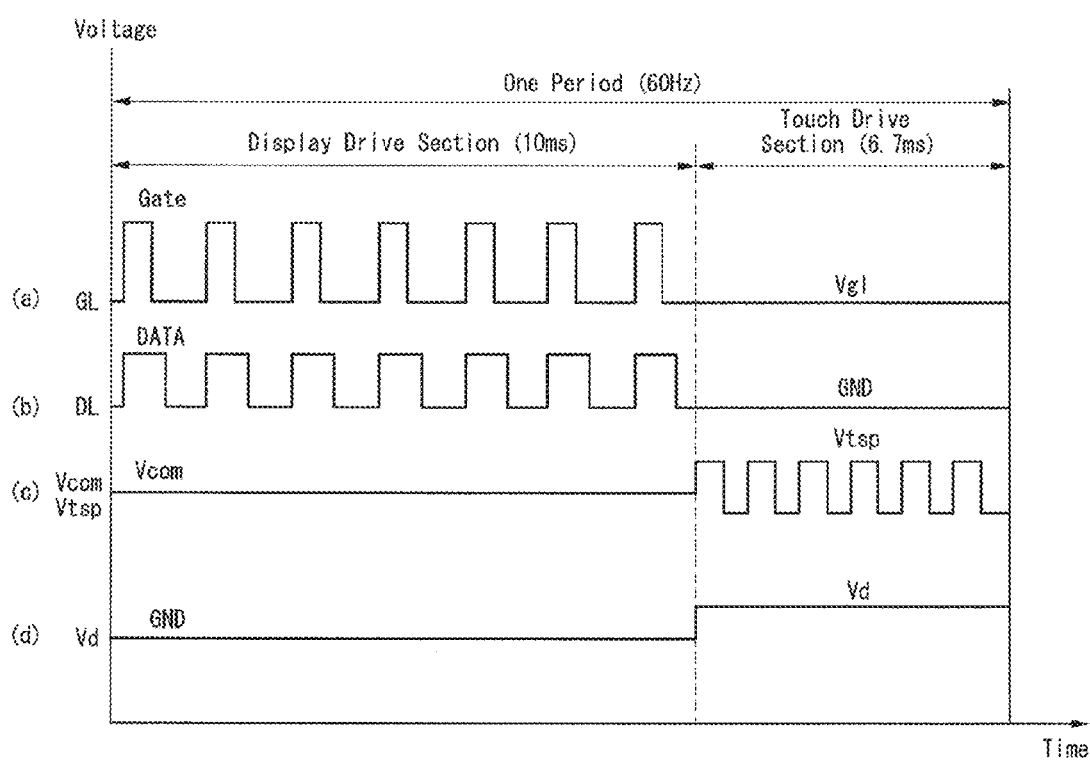
FIG. 12 is a view illustrating 60 Hz time division driving in a touch sensor integrated display device according to an embodiment of the present invention.

The touch sensor integrated liquid crystal display device according to the embodiment of the present invention is driven by the time division. As illustrated in FIG. 12, one period for the time division driving includes display drive sections and touch drive sections. When the display driving is turned on, the touch driving is turned off and vice versa to minimize signal interferences between the display driving operation and the touch driving operation. For example, in the case of the 60 Hz time division driving, one period has a time interval of 16.7 ms which is divided into two sections, one for the display drive section (about 10 ms), and the other for the touch drive section (about 6.7 ms).

In the display drive sections, the host controller 100 controls the power supply unit 105 to simultaneously supply a common voltage Vcom to, for example, the common electrode COM including the touch electrodes C11 to C33 through, for example, the signal lines TY11 to TY13 illustrated in FIG. 5A. In synchronization with gate pulses sequentially output from the gate driving unit 103, The data driving unit 102 supplies pixel voltages Data corresponding to digital video data to the pixel electrodes P11 to P66 through the data lines D1 to Dn. As a result, an electric field is generated in the liquid crystal layers by the common voltage Vcom and the pixel voltage Data which are respectively applied to the common electrode COM and the pixel electrodes P11 to P66. The generated electric field can change a state of the liquid crystal layer to thus perform a display operation. Voltage values for initial static capacitances of the touch electrodes C11 to C13 are measured and stored, respectively, by a touch recognition processor 107 which is connected to a plurality of touch electrodes C11 to C13 through signal lines TX11 to TX33, respectively.

In a touch drive section, the host controller 100 controls the power supply unit 105 to sequentially supply touch drive voltages Vtsp to the touch electrodes C11 to C33 constituting the common electrode COM through, for example, the signal lines TY11 to TY33 illustrated in FIGS. 5A and 5B. The touch recognition processor 107 connected to a plurality of touch electrodes C11 to C33 differentially amplifies the stored voltage values of the initial static capacitances for the touch electrodes C11 to C33 and the static capacitance voltage Vd measured in the touch drive section and converts the amplified resultant values into digital data. Using a touch recognition algorithm, the touch recognition processor 107 determines touch spots generated by the touch operation based on differences between the initial static capacitances and the touch static capacitances and outputs touch coordinate data indicating the touched spots.

In the above touch sensor integrated liquid crystal display device which uses the time division drive operation, during the touch drive section, the display drive operation is off and stops sending signals to the gate lines GL and the data lines DL, and during the display drive section, the touch drive operation is off and stops supplying the common voltage Vcom.

The touch sensor integrated display device according to the embodiments of the present invention can reduce thickness and improve durability of the device since the touch sensor for recognizing the touch operation can be also used as one constituent element of the display device.

Further, the touch sensor integrated display device according to the embodiments of the present invention described above can reduce the number of the signal lines so that a multi-touch can be recognized by a relatively simple circuit wiring structure since it is not required to constitute the touch driving lines and the touch sensing lines for recognizing the touch operation.

The touch sensor integrated display device according to the embodiments of the present invention can further increase the level of the static capacitance compared to the mutual static capacitance type, thus improving the precision of the multi-touch recognition, since it is possible to prevent noise caused by the parasitic static capacitance.

The touch sensor integrated display device according to the embodiments of the present invention can improve the aperture ratio by having the signal lines for recognizing the touch operation overlap the data lines.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:
1. A touch sensitive display device, comprising:
a plurality of gate lines including a first gate line;
a plurality of data lines including a first data line;
a plurality of touch electrodes including at least a first touch electrode and a second touch electrode; and
a plurality of signal lines including at least a first signal line and a second signal line, wherein the first signal line is electrically connected to the first touch electrode, and the second signal line is electrically connected to the second touch electrode, wherein the first signal line overlaps with the first touch electrode and the second touch electrode, the first signal line not overlapping with the second signal line within areas of the touch sensitive display device overlapping with the first touch electrode and the second touch electrode in a plan view, wherein the second signal line overlaps with the second touch electrode, and wherein the first signal line does not directly contact the second touch electrode and is not electrically connected to the second touch electrode through any contact hole overlapping with the second touch electrode.

2. The touch sensitive display device of claim 1, further comprising a plurality of pixel electrodes including at least a first pixel electrode and a second pixel electrode, wherein the first touch electrode overlaps with the first pixel electrode, and the second touch electrode overlaps with the second pixel electrode, and wherein the first signal line and the second signal line overlap with the first gate line.

3. The touch sensitive display device of claim 1, wherein:

the plurality of touch electrodes further includes a third touch electrode, the plurality of signal lines further includes a third signal line, the third signal line is electrically connected to the third touch electrode, the third signal line overlaps with the third touch electrode, third signal line not overlapping with the first signal line or the second signal line within an area of the touch sensitive display device overlapping with the third touch electrode in the plan view, and the third signal line is not electrically connected to any of the first touch electrode and the second touch electrode within the areas of the touch sensitive display device overlapping with the first electrode and the second electrode in the plan view.

4. The touch sensitive display device of claim 1, wherein the first signal line is electrically connected to only the first touch electrode among the plurality of touch electrodes within areas of the touch sensitive display device overlapping with the plurality of touch electrodes in the plan view.

5. The touch sensitive display device of claim 1, wherein the first signal line and the first data line are disposed directly on a same underlying layer.

6. The touch sensitive display device of claim 1, wherein the first signal line is electrically connected with the first touch electrode via a plurality of contact holes spaced apart from each other and overlapping with the first touch electrode.

7. The touch sensitive display device of claim 6, wherein the first signal line includes a plurality of branches that are spaced apart from each other and overlap with the first touch electrode, the plurality of branches being connected with each other.

8. The touch sensitive display device of claim 7, wherein each of the plurality of branches is electrically connected to the first touch electrode via at least one of the plurality of contact holes.

9. The touch sensitive display device of claim 6, wherein the first signal line has a protrusion overlapping with one of the plurality of contact holes.

10. The touch sensitive display device of claim 1, wherein:

the touch sensitive display device has at least one display drive period and at least one touch drive period within one frame period, and the first touch electrode and the second touch electrode are configured to receive a common voltage during the at least one display drive period and to receive a touch drive voltage during the at least one touch drive period.

11. A touch sensitive display device, comprising:

a plurality of gate lines;
a plurality of data lines;
a plurality of touch electrodes arranged in a direction, the plurality of touch electrodes including at least a first touch electrode and a second touch electrode; and
a plurality of signal lines including at least a first signal line and a second signal line spaced apart from each other, each of the first signal line and the second signal line being electrically connected with the first touch electrode via a corresponding contact hole overlapping with the first touch electrode, wherein each of the first signal line and the second signal line overlaps with the second touch electrode without being electrically connected with the second touch electrode through any contact hole overlapping with the second touch electrode in a plan view.

12. The touch sensitive display device of claim 11, wherein the first signal line and the second signal line are connected to each other without overlapping with each other within an area of the touch sensitive display device overlapping with the first touch electrode in the plan view, and wherein the first signal line and the second signal line do not directly contact the second touch electrode.

13. The touch sensitive display device of claim 11, wherein at least one of the first signal line and the second signal line has a protrusion overlapping with the corresponding contact hole.

14. The touch sensitive display device of claim 11, wherein at least one of the plurality of touch electrodes overlaps with each of the plurality of the signal lines.

15. The touch sensitive display device of claim 11, further comprising a plurality of pixel electrodes including at least a first pixel electrode and a second pixel electrode, wherein the first touch electrode overlaps with the first pixel electrode, and the second touch electrode overlaps with the second pixel electrode, and wherein the first signal line and the second signal line overlap with at least one of the plurality of gate lines.

16. The touch sensitive display device of claim 11, wherein:

the touch sensitive display device has at least one display drive period and at least one touch drive period within one frame period, and the first touch electrode and the second touch electrode are configured to receive a common voltage during the at least one display drive period and to receive a touch drive voltage during the at least one touch drive period.

17. A touch sensitive display device, comprising:

a plurality of gate lines;
a plurality of data lines;
a plurality of touch electrodes arranged in a direction, the plurality of touch electrodes including a first touch electrode and a second touch electrode; and
a plurality of signal lines including at least a first signal line, the first signal line being electrically connected to the first touch electrode via a plurality of first contact holes spaced apart from each other, wherein the first signal line overlaps with the second touch electrode without being electrically connected with the second touch electrode through any contact hole overlapping with the second touch electrode in a plan view.

18. The touch sensitive display device of claim 17, wherein each of the plurality of first contact holes overlaps with the first touch electrode.

19. The touch sensitive display device of claim 17, wherein the first signal line includes a plurality of branches that are spaced apart from each other and overlap with the first touch electrode, the plurality of branches being connected with each other.

20. The touch sensitive display device of claim 19, wherein each of the plurality of branches is electrically connected to the first touch electrode via at least one of the plurality of first contact holes.

21. The touch sensitive display device of claim 17, wherein at least one of the plurality of touch electrodes overlaps with each of the plurality of the signal lines.

22. The touch sensitive display device of claim 17, wherein the first signal line extends in parallel with at least one of the plurality of data lines, the first signal line being adjacent to the one of the plurality of data lines without overlapping with the one of the plurality of data lines in the plan view.

23. The touch sensitive display device of claim 17, wherein the plurality of signal lines extends in parallel with the plurality of data lines, only one of the plurality of signal lines being between two adjacent data lines among the plurality of data lines.

24. The touch sensitive display device of claim 17, wherein the plurality of signal lines extends in parallel with the plurality of data lines, only one of the plurality of data lines being between two adjacent signal lines among the plurality of signal lines.

25. The touch sensitive display device of claim 17, wherein the first signal line has a protrusion overlapping with one of the plurality of first contact holes.

26. The touch sensitive display device of claim 17, further comprising a plurality of pixel electrodes including at least a first pixel electrode and a second pixel electrode,
wherein the first touch electrode overlaps with the first pixel electrode, and the second touch electrode overlaps with the second pixel electrode, and
wherein the first signal line overlaps with at least one of the plurality of gate lines.

27. The touch sensitive display device of claim 17, wherein the plurality of signal lines further comprises a second signal line, the second signal line being electrically connected to the second touch electrode via a plurality of second contact holes spaced apart from each other, and
wherein the first signal line does not directly contact the second touch electrode.

28. The touch sensitive display device of claim 17, wherein:
the touch sensitive display device has at least one display drive period and at least one touch drive period within one frame period, and
the first touch electrode and the second touch electrode are configured to receive a common voltage during the at least one display drive period and to receive a touch drive voltage during the at least one touch drive period.

* * * * *